C. L. BAIR.
FULL JOINT HINGE BOW TOP.
APPLICATION FILED JAN. 14, 1914.
1,171,918.
Patented Feb. 15, 1916.
5 SHEETS—SHEET 2.
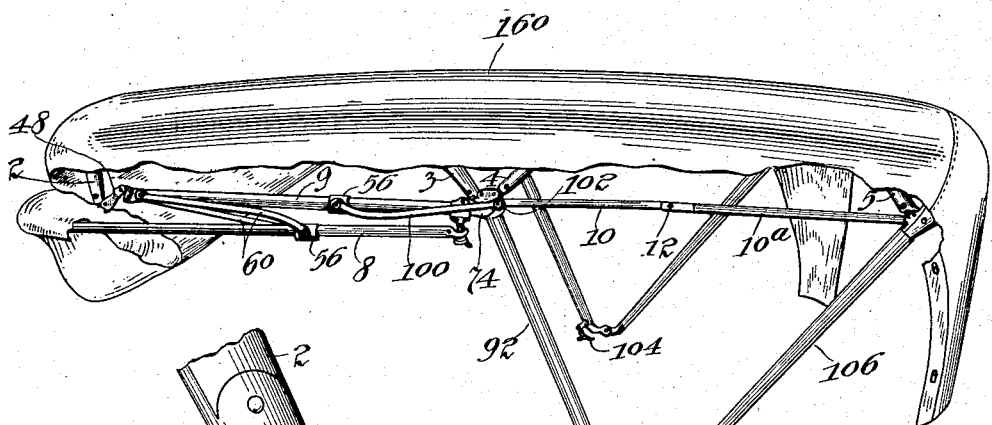
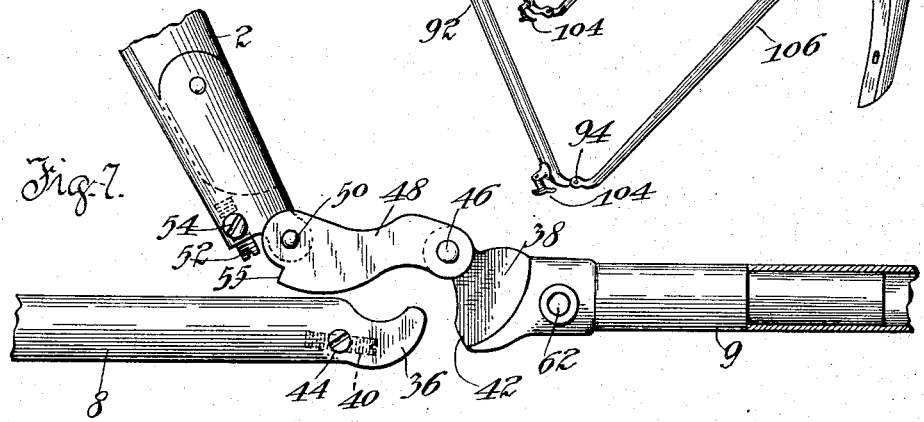
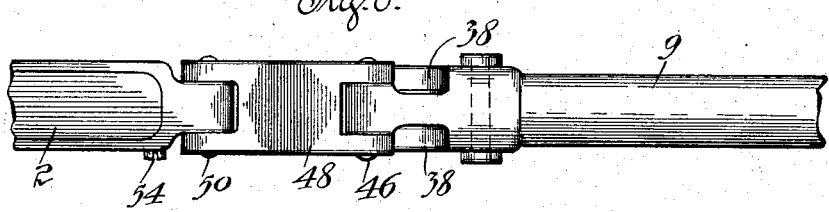
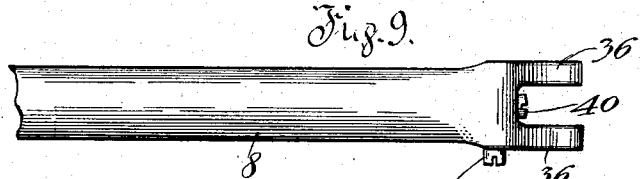
Witnesses
Robert H. Weir
Arthur W. Carlson
Inventor
Clarence L. Bair
by Cheever & Cox
Attys.
THE COLUMBIA PLANOGRAPH CO., WASHINGTON, D. C.

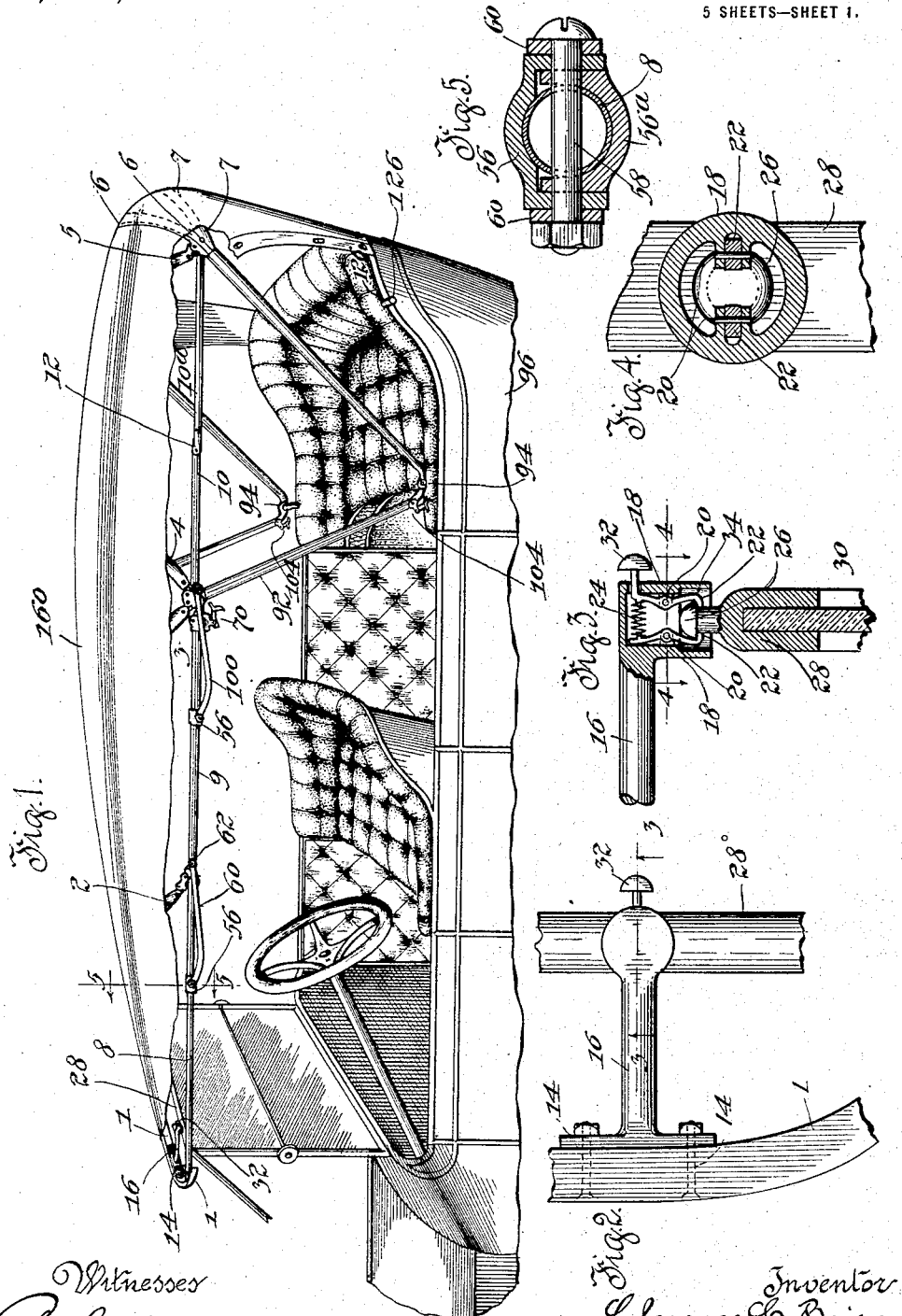

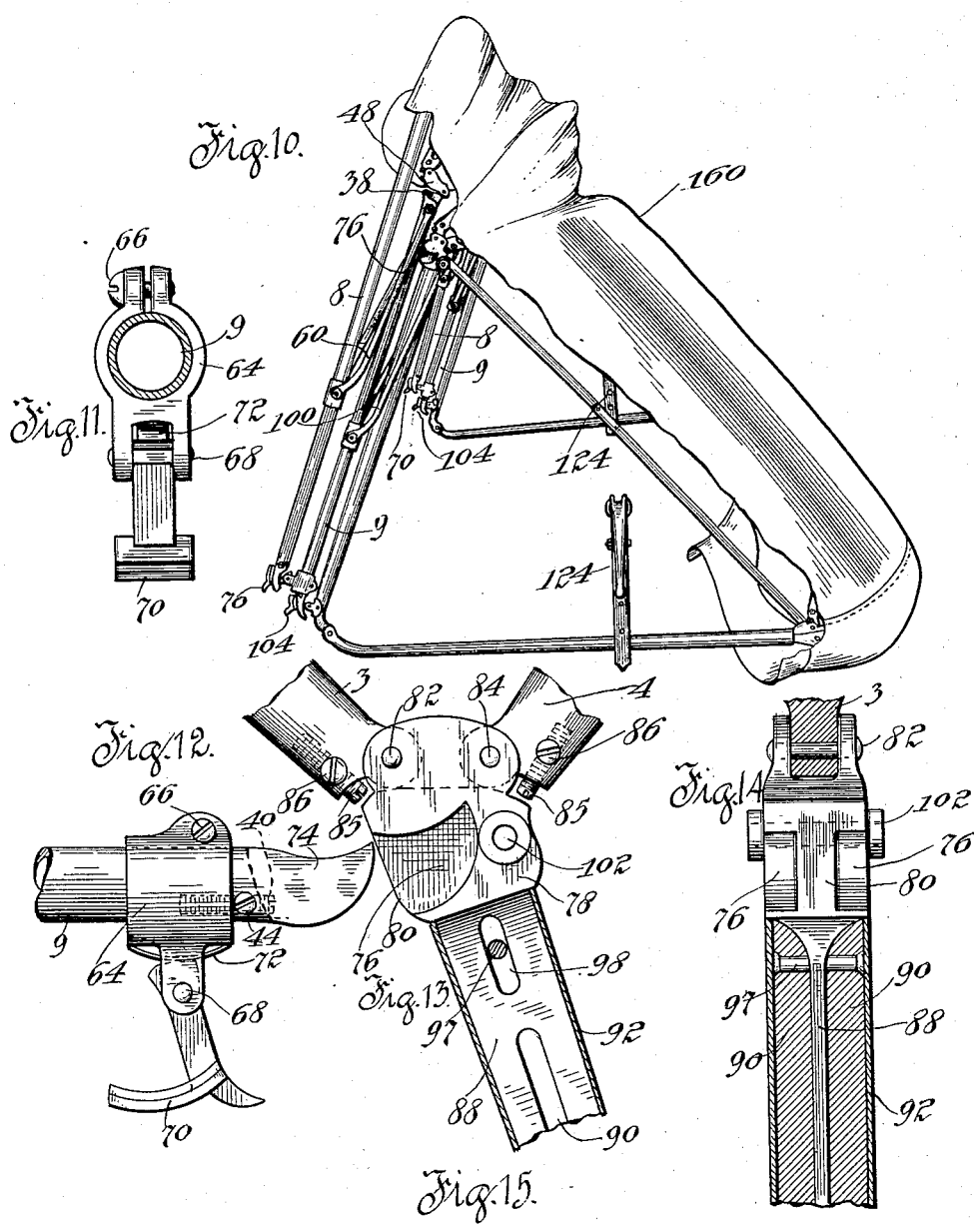

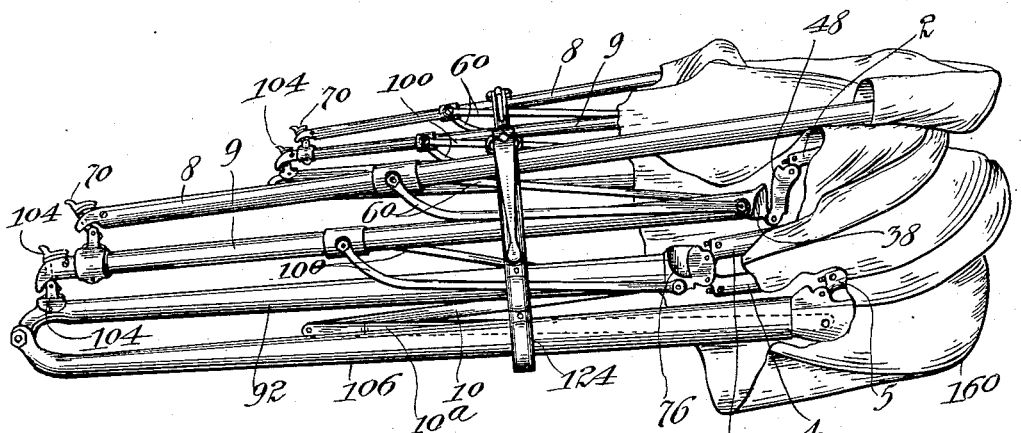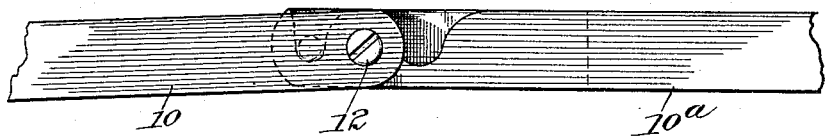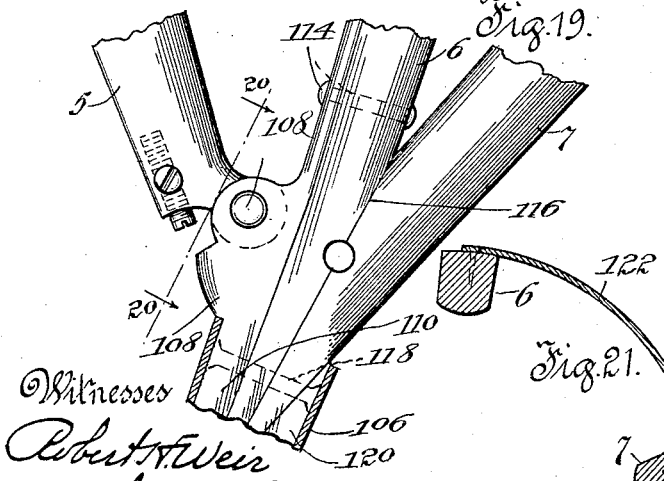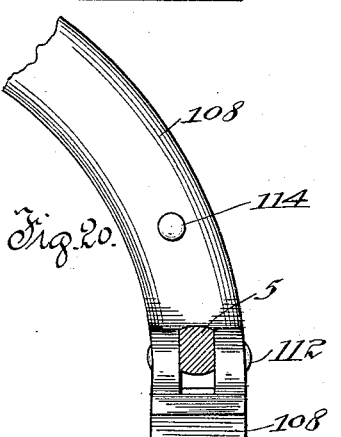

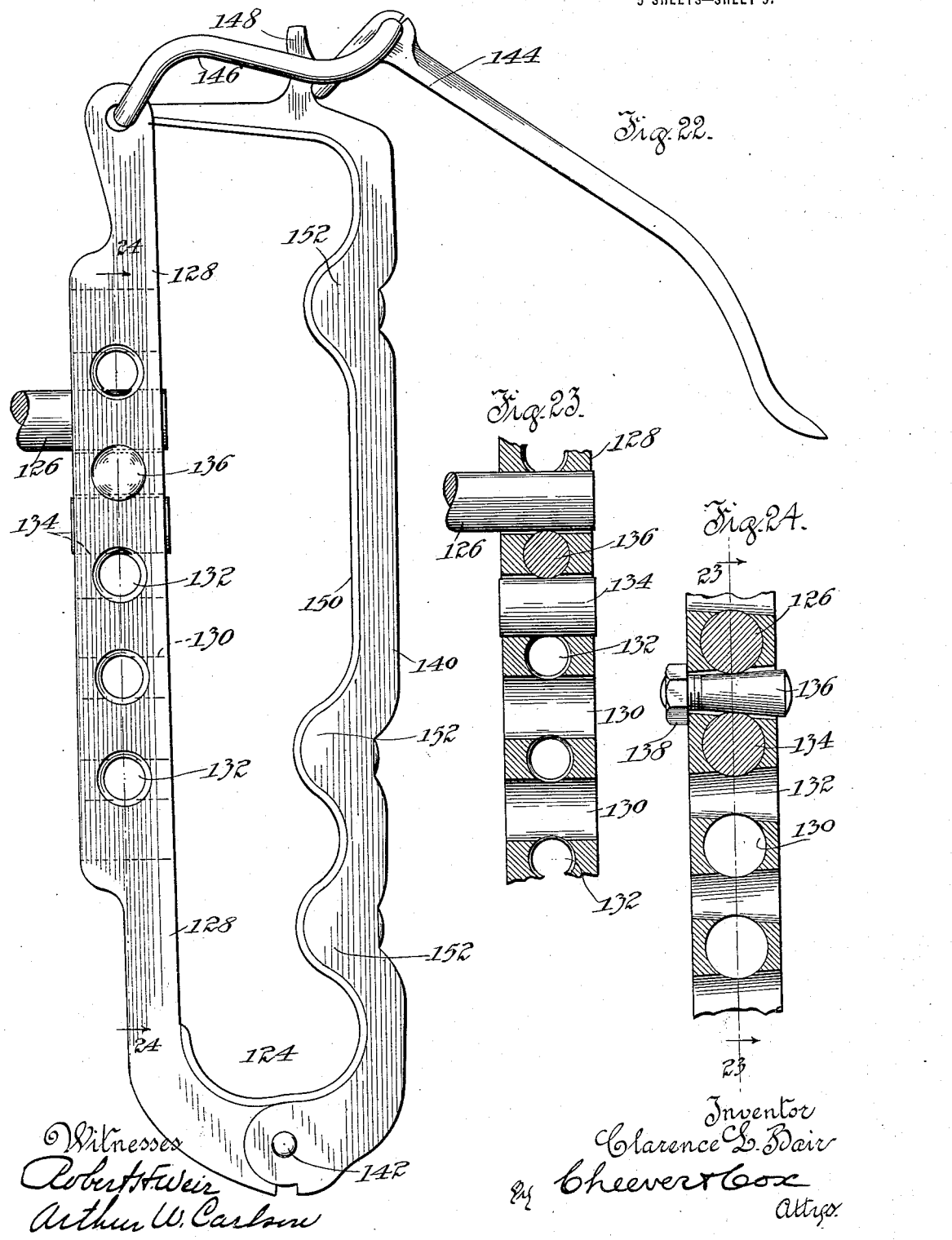

UNITED STATES PATENT OFFICE.

CLARENCE L. BAIR, OF CHICAGO, ILLINOIS, ASSIGNOR TO AUTO SPECIALTIES MANUFACTURING CO., OF SAN FRANCISCO, CALIFORNIA, A CORPORATION OF CALIFORNIA.

FULL-JOINT HINGE BOW-TOP.

1,171,918.          Specification of Letters Patent.      Patented Feb. 15, 1916.

Application filed January 14, 1914. Serial No. 812,047.

*To all whom it may concern:*

Be it known that I, CLARENCE L. BAIR, a citizen of the United States, residing at Chicago, in the county of Cook and State of Illinois, have invented a certain new and useful Improvement in Full-Joint Hinge Bow-Tops, of which the following is a specification.

This invention relates to full joint hinge bow tops for use upon vehicles and especially upon automobiles.

The object of the invention is to provide a top of this class of exceedingly simple and light construction which can be readily moved by one person in the car, to which it is applied, from extended to folded position and vice versa.

The invention consists in a structure which can be easily and cheaply made, installed and used for carrying out the foregoing object and which is not readily liable to get out of order.

More in detail the invention consists in the use of a spliced extension side member having its parts detachably connected together by a joint or joints of exceedingly rigid construction which render the side members rigid so that the front bow socket ordinarily rising from the front seat of the car may be entirely omitted.

It further consists in a novel adjusting device for properly positioning the various parts of the top before the cover proper is applied and for afterward taking up slack which occurs therein due to wear and stretch.

The invention also consists in features and details of construction which will be hereafter more fully described, among other things in a novel form of top holder for securing the parts of the top in folded position.

In the drawings, Figure 1 is a perspective view of an automobile body having the top of this invention applied thereto. Fig. 2 is a detail plan view of the method of connecting the front bow or bow No. 1 to the wind shield. Fig. 3 is a sectional detail view partially in section on the line 3—3, of Fig. 2. Fig. 4 is a plan view on the line 4—4 Fig. 3. Fig. 5 is a sectional detail view on the line 5—5 of Fig. 1. Fig. 6 is a perspective view of the top illustrated in Fig. 1, after the front section of the top has been folded in. Fig. 7 is a side view of the parts which when connected together form the joint connection to which bow No. 2 is attached. Fig. 8 is a plan view of all of the parts shown in Fig. 7. Fig. 9 is a plan view of the end of the lower left hand member of the parts shown in Fig. 7. Fig. 10 shows the top in the third position which the parts assume as they are folded up. Fig. 11 is an end view of the trigger device for locking or connecting the ends of the side sections of the top together. Fig. 12 is a side view of the parts illustrated in Fig. 11. Fig. 13 is a side view of hinge socket to which bows 3 and 4 are connected. Fig. 14 is a side view of the parts of Fig. 13 looking at them from the right hand side of Fig. 13. Fig. 15 is a plan view of the fork which engages the hinge socket, the same being shown in side view at the right hand portion of Fig. 12. Fig. 16 shows the top in fully folded position. Fig. 17 is a side detail of the joint in the rear side section of the frame. Fig. 18 is a plan view of the parts shown in Fig. 17. Fig. 19 is a side view of the juncture of bows 5, 6 and 7. Fig. 20 is a front view taken on the line 20—20 of Fig. 19. Fig. 21 is a side view in section of the support for the upper rear curve at the top frequently called the Grecian bend. Fig. 22 is a side, enlarged, detail view of my improved top holder. Fig. 23 is a sectional, detail view on the line 23—23 of Fig. 24. Fig. 24 is a sectional, detail view on the line 24—24 of Fig. 22.

For convenience the bows proper of this top are designated with the numbers 1 to 7 inclusive, as clearly appears in the different figures, particularly Fig. 1. When the top is in extended position as shown in Fig. 1, these bows all rise directly or indirectly from the side frame of the top, viz., a continuous member extending along each side, the same being, however, made in parts or sections, preferably alined one with the other so that both simplicity of construction and neatness of appearance are obtained. In the particular case here illustrated each side frame comprises, viz., a forward section, 8, an intermediate section 9, and a rear section 10. This latter section is made in two parts 10 and 10ª connected together by a hinge or joint 12. The forward ends of forward section members 8 and bow No. 1 are rigidly connected together by any suitable means. In the particular case here illustrated bow No. 1 is made of wood and forward section members 8 are made of hollow steel and the ends of the bow are driven into or socketed into the ends of the side members 8, thereby lightening the construction over the use of a metal bow No. 1.

Rigidly secured to bow 1 by means of bolts or rivets 14 are two or more horizontal braces 16 carrying at their inner ends casing members 18 within which are pivotally mounted at 20 latch members 22 controlled by a spring 24 adapted to latch over a knob 26 extending from the rim 28 of the wind shield 30. One of each pair of latch members is provided with a handle 32 which may be pressed inward against the action of spring 24 to release this latch device from the top of the wind shield. It will be noticed that the knob 26 on the top of the wind shield extends up into a hollow recess 34 in the casing member 18 where it engages the latch members 22, there being thus no danger of the operator's inadvertently catching any article of apparel upon the latch members 22 either during the act of attaching or detaching the parts or otherwise.

The rear end of each forward section side member 8 is forked as clearly shown in plan view in Fig. 9 into two side members 36 adapted to fit into corresponding recesses 38 on the forward end of the adjacent intermediate section member 9. In the space between the fork members 36 and screw threaded into the body of member 8 is a screw 40 whose outer end is adapted to bear at 42 on the end of the adjacent member 9 so that the angularity of members 8 and 9 to each other may be adjusted by the distance which the outer end of screw 40 extends from the body of the member 8. This adjusting screw 40 may be locked in position by a lock screw 44 which is adapted to be tightened up against the side of the screw 40.

Pivoted upon the upper portion of the member 38 of intermediate member 9 at 46 is a short link 48 to whose outer end is pivoted at 50 bow 2. The adjacent end of bow No. 2 contains a screw 52 similar to screw 40, heretofore described, adapted to be adjusted in and out of bow No. 2 and to contact link 48 at 55 with the result that the angular position of the link and bow 2 may be varied by adjusting the position of this screw. The screw 52 may be locked in position by a screw 54 corresponding to screw 44 heretofore described. The function of link 48 in combination with set screw 52 is to allow the builder of the device to adjust bow 2 so that it assumes proper position in the extended structure, as shown in the drawings, and yet may be swung into alinement with intermediate members 9 when the top is in collapsed position, which would not be possible if bow 2 with the adjusting screw 52 therein were directly connected to members 9 at 46.

Rigidly mounted near the center of each forward member 8 is a sleeve 56 clearly shown in Fig. 5. This sleeve is preferably made in two parts 56 and 56ª interfitted together as is clearly shown in the figure. Through the parts 56 and 56ª and through the rod member 8 which they inclose is passed a bolt 58. On the ends of this bolt are journaled parallel link members 60. This sleeve 56 forms a support for the pivot screw 58 and reinforces the member 8 at this point sufficiently so that it can carry the strain communicated to it by the link member 60. The construction here shown has the special advantage that in building the top in the first place, the proper position of the sleeve may be determined by experiment before the holes for the bolt 58 are made, thus insuring accurate positioning of the parts in a manner which would not be possible were the sleeves brazed onto the members 8 before assembling began. The opposite ends of the link member 60 are pivoted upon a bolt or screw 62 near the forward end of the adjacent intermediate side member 9.

On the inner or rear end of each member 9 is a sleeve 64 connected in rigid position by any suitable means such for instance as the screw 66 and upon the lower side of this sleeve 64 is a pivot pin 68 to which is pivotally connected a trigger 70 controlled by a spring 72. This trigger 70 is so located and shaped that when the adjacent forward side member 8 has been swung from the position of Fig. 1 to that of Fig. 6, the trigger rests in the space between the fork members 36 and under the inner end of side member 8 and thus detachably supports the member 8 in the position shown in Fig. 6. By swinging the trigger to the right from the position shown in Fig. 6, the end of member 8 is released and the operator can move the side members 8 about the axis 62 as a center from the position of Fig. 6 to that of Fig. 1.

On the rear end of each side member 9 are fork members 74 corresponding in design and function to the members 36 heretofore described and between them are located screws 40 and 44 as before. These fork members 74 are adapted to enter recesses 76 in the sides of the socket casting 78 and the adjacent screw 40 is adapted to bear against this casting at 80 in the same manner and for the same purposes as screw 40 bears at 42. This socket casting 78 has pivoted to it at 82 bow No. 3 and has pivoted to it at 84 bow 4. These bows have adjusting screws 85 controlled by lock screws 86. So far as function is concerned, these screws 85 and 86 correspond exactly to screws 40 and 44, heretofore described.

The casting 78 has extending from its bottom a metallic member 88 to the opposite sides of which are connected wooden members 90 and the combined device is driven into the forward socket member 92 pivoted at 94 upon the body 96 of the car. A rivet 97 passing through slots 98 in the combined member 88—90 permits of adjustment of the member 78 with the socket 92 with reference to each other before this rivet is finally secured in place. This construction is fully shown, described and claimed in my prior United States application, Serial Number 661,221.

Located near the middle of each member 9 is a sleeve device 56 heretofore described to which is pivotally connected a pair of link members 100 pivoted at 102 on the casting 78. These link members 100 correspond in function to link members 60, heretofore described.

At the lower portion of each member 92 is a trigger device 104 of similar construction to trigger device 70, heretofore described, adapted to receive and hold the end 74 of member 9 when the device has been folded from the position of Fig. 6 to that of Fig. 10 and thence to that of Fig. 16.

Pivoted at 94 on each side of the body 96 is a rear socket member 106 carrying at its upper end the composite structure illustrated in Fig. 19, comprising bows 5, 6 and 7. These last mentioned parts are secured to this rear socket through the construction shown in Fig. 19 in which a metallic plate member 108 is provided having an end 110 extending substantially down into the socket. To this metallic plate member is pivoted at 112 bow 5. To this plate member is riveted, as shown, bow 6, rivet 114 being used for the purpose. Bow 7 is secured in position by means of glue along the line 116 and the rivet 118 which passes through the lower end of the bow 7, bow 8 and through plate 108. A wooden member 120 is also attached and the whole is driven into the socket 106. This construction is important in insuring the position of bows 6 and 7 with reference to each other so that their outer ends can be connected by the metallic curved member 122 to give the Grecian bend shape to the rear end of the top.

The upper ends of sockets 92 and 106 are connected together by the rear side members 10, heretofore described, pivoted together at 12 as shown and adapted to be folded as shown, so as to permit the proper assembling of all of the parts when the device is in collapsed position, all as shown in the drawings.

When the top has been fully collapsed, as shown, the members 8, 9, 92 and 106 are positively secured in position by the use of a top holder 124 supported upon a stud 126 extending from the side of the car. This top holder is adjustable vertically with reference to the body of the car so that it can be adjusted to such a position that when closed upon the parts which it is designed to contain, as shown, it keeps the parts which are held in position by the triggers 70 and 104 in such a position that they cannot jar out of engagement with said triggers and thus destroy the proper collapsed position of the parts to say nothing of permitting the rattle and other noises.

The manner in which the top holder is adjustable is fully shown in Figs. 22, 23 and 24. The back member 128 of the top holder is provided with a plurality of parallel holes 130 of proper size to receive the member 126 while transversely of these holes 130 are a plurality of small bolts of such size that the circumference of the stud 126 and an equal sized idle plug placed in the adjoining hole, each enter the circumference of the intermediate hole 132 with the result that when a taper bolt or pin 136 controlled by a nut 138 is inserted in the intermediate hole 132, this pin or bolt 136 will take bearing upon the member 126 and adjacent pin 134 and thus rigidly secure the top holder directly to the stud 126.

The front member 140 of the bow holder is pivoted to the rear member at 142 and is locked in position by a latch member 144 controlled by a spring 146, the latch member proper 144 engaging a lug 148. The inner face of the forward member 140 is provided with a leather lining 150 and in the particular form here shown is provided with separating ridges 152, but these are not essential to this invention as by the use of the spring clamp device 144, 146, 148, in combination with the leather protecting device 150, it is possible to clamp the front member 140 upon the folded bow so tightly that all side play is avoided, thereby doing away with the serious damage which occurs in all prior devices where any side play takes place. In the particular case here illustrated, the bow holder engages the links 60 and 100 and by pressing strongly against them, positively secures all of the parts in position for obviously with these links tightly pressed, it is impossible for any other parts of the top to move. In other words, these tightly pressed links serve the function of separators.

The supporting bows 1 to 7 inclusive are covered by any suitable top cover 160.

In the operation of the device all the parts except the cover 160 are first assembled in approximately the position of Fig. 1 and brought to the actually desired position by properly adjusting the various adjusting screws 40, 52 and 85, whereupon the top 160 proper is stretched into position and permanently secured in that position to the various bows. In order to lower the top the operator first presses upon the knobs 32 thus releasing the bow 1 from the wind shield. He then raises side members 8 sufficiently above the horizontal so as to unlatch members 36 from contact with member 38. He thereupon swings members 8 from the position of Fig. 1 to that of Fig. 6, at the conclusion of this movement snapping in the triggers 70. The operator next takes hold of side members 8 and 9 in the position of Fig. 6 and raises their outer ends sufficiently so as to unlatch member 74 from engagement with recesses 76 and then inserts members 74 under the control of triggers 104, the parts now being in the position of Fig. 10. The operator now breaks joints 12, thus in the ordinary manner collapsing the rear section of the top with the result that the parts assume the position shown in Fig. 16 where the bow holders 124 are applied, the bow holders having been first adjusted so as to hold the top at the proper height above the wheels or other objects on the side of the car which might interfere with them. When it is desired to raise the top, the operator performs the foregoing movements in reverse order.

It will be noticed that the construction of the joint for connecting side sections 8 and 9 together and for connecting section 9 to casting 78, is such that the greater the weight upon the supported section, the tighter the joint is locked, i. e., the greater pressure there is tending to force the fork members 36 and 74 into their respective seats.

Having thus described my invention, what I claim as new and desire to secure by Letters Patent, is:

1. In the art described, a pair of normally alined horizontal side members, bows connected thereto, and a top member over said bows, said side frame members being separable between their ends into a plurality of sections and movable to a position where they are parallel and adjacent to each other, and links connecting the adjacent parts of the side frames in all positions.

2. In the art described, in combination with a vehicle body, a pair of socket members pivoted together on each side of the vehicle body, a horizontal normally alined side frame for each side of the vehicle pivotally connected at one end to one of the socket members on each side of the vehicle and at a point between its ends to the other adjacent socket member so that a substantial portion of each side frame overhangs one of its socket members, means supporting a top cover member from the side frames, means permitting selectively separating the overhanging portion of each side frame from the remainder of its side frame and moving it from its position in alinement with the remainder of the frame to a position parallel with its adjacent socket member, means for detachably connecting the thus moved side frame member to said adjacent socket member, and means allowing collapsing the portion of the side frame which is between the socket members.

3. In combination with a vehicle body and a support rising from each side thereof, a pair of side frames extending horizontally from said side supports, each of said side frames beyond its support being separable into two parts and movable from its said horizontal position in which it is in alinement with the rest of its side frame to a position where these parts are parallel to each other and parallel to the supports, means for detachably securing one of the parts of each side frame when in the last mentioned position to the adjacent side frame part, and means for securing the last mentioned side frame part to the fixed support, this in combination with means for supporting the top proper from the side frames whereby when said side frames are in alined horizontal position the top is supported in extended position and when the side frames are disconnected and supported as described the portion of the top carried by said side frames is supported in collapsed position.

4. In the art described, a vehicle body, a support rising from each side of the body near the rear thereof, another support, such as a wind-shield rising from the front of the body, a pair of normally horizontal side frames, comprising a plurality of alined parts, connected to said rear support and to said wind-shield support, a top covering supported upon said side frames, said side frames being separable into a plurality of parts intermediate between the wind-shield and the rear supports and movable from said alined position to a position where they are parallel to each other and supported from the rear support whereby the portion of the top cover between the wind-shield and the rear supports is selectively collapsible or extensible for the purposes set forth.

5. In the art described, a side frame made in two sections, a link pivotally connected to each of said sections adapted to permit their movement between two positions; in one of which they are end to end and in the other of which they are parallel to each other, and means for detachably connecting the sections of the side frame together in each of said positions.

6. In the art described, a pair of wholly separable side frame sections normally connectible end to end, and an adjusting screw in one of said sections bearing against the other section to change the angular position of the two sections with reference to each other.

7. In the art described, two side frame sections normally connectible end to end, a link device pivoted to each section to permit rotary but prevent longitudinal movement of one section with reference to the other, and a device at the point of contact of said two sections adapted to be adjusted to different positions to vary the alinement of the two sections.

8. In the art described, two side frame sections normally connectible end to end, a link device pivoted to each section to permit rotary but prevent longitudinal movement of one section with reference to the other, and a screw device at the point of contact of said two sections adapted to be adjusted to different positions to vary the alinement of the two sections.

9. In the art described, a supporting member, a short link pivoted to the supporting member, a lateral support for the link, a bow pivoted to said short link and an adjusting device for varying the angular position of the bow with reference to the short link, for the purposes set forth.

10. In the art described, a supporting member, a short link pivoted to the supporting member, a lateral support for the link, a bow pivoted to said short link and an adjusting screw device for varying the angular position of the bow with reference to the short link, for the purposes set forth.

11. In the art described, two horizontal bow sections detachably connectible in substantial alinement with each other, a short link 48 pivotally connected to one of said members, a bow pivoted to said short link, a screw 52 in the end of the bow adapted to bear upon the link, all of the parts being arranged and disposed as shown and described for the purposes set forth.

12. In the art described, in combination with a supporting rod and a link adapted to be pivotally connected thereto, a sleeve made in two parts interfitting with each other and inclosing the rod, and a bolt passing through the two parts of the sleeve and the rod forming a bearing for the link.

13. In the art described, a casting 78 provided with means for attachment to a bow socket and adapted to receive a horizontal supporting side frame member and adapted to have another side frame member pivoted thereto, two bow members pivoted to said casting, and means for adjusting the angular position of each bow member with reference to said casting, all of the parts being arranged and disposed substantially as shown and described for the purposes set forth.

14. In the art described, two side members connectible end to end, a link pivoted to both of said side members so as to permit one of said members to swing from its position in line with the other member to a position in which it is substantially parallel to the other member, and a trigger device connecting said side members in said last mentioned position for the purposes described.

In witness whereof, I have hereunto subscribed my name in the presence of two witnesses.

CLARENCE L. BAIR.

Witnesses:
DWIGHT B. CHEEVER,
KATHRYN S. READY.

Copies of this patent may be obtained for five cents each, by addressing the "Commissioner of Patents, Washington, D. C."